United States Patent [19]

Remillieux

[11] 3,747,989

[45] July 24, 1973

[54] ANTISKID DEVICE FOR A VEHICLE BRAKING SYSTEM

[75] Inventor: Paul Remillieux, Paris, France

[73] Assignee: Societe Anonyme D.B.A.

[22] Filed: May 21, 1971

[21] Appl. No.: 145,675

[30] Foreign Application Priority Data
June 1, 1970 France .............................. 7019973

[52] U.S. Cl................................. 303/21 P, 303/20
[51] Int. Cl............................................. B60t 8/12
[58] Field of Search...................... 188/181; 303/20; 324/160–162; 340/52 R, 262–263

[56] References Cited
UNITED STATES PATENTS
3,532,393   10/1970   Riordan .......................... 303/21 BE
3,556,610   1/1971    Leiber ............................. 303/21 P
3,604,760   9/1971    Atkins ...................... 303/21 BE UX
3,625,572   12/1971   Marouby......................... 303/21 BE FOREIGN PATENTS OR APPLICATIONS
1,810,163   7/1970    Germany ........................ 303/21 BE
1,901,476   7/1970    Germany ........................ 303/21 BE Primary Examiner—Milton Buchler
Assistant Examiner—Stephen G. Kunin
Attorney—W. N. Antonis and Plante, Hartz, Smith and Thompson

[57] ABSTRACT

An electronic anti-skid device for a vehicle braking system, operative upon actuation of the brake pedal to periodically apply the brakes and isolate the braking system from the brake pedal under the control of signals representative of the wheel acceleration. During the periods when the braking system is isolated, the wheel acceleration curve comprises a negative portion followed by a positive portion having a peak value. With this device, the periods when the braking system is isolated are ending shortly after the wheel acceleration has reached its peak value. This is obtained by comparing the positive portion of the acceleration signal with the output signal of a time-constant circuit having a discharge curve which intersects the acceleration curve in the neighborhood of the peak value.

2 Claims, 6 Drawing Figures

ANTISKID DEVICE FOR A VEHICLE BRAKING SYSTEM

This invention relates to anti-skid devices adapted to co-operate with a vehicle braking system to prevent the wheels from locking in braking and thus to improve the lateral stability of the vehicle while reducing the stopping distance. The invention relates more particularly to an anti-skid device of the kind comprising an electronic sensing unit and an actuating unit, the latter comprising an isolating element and a releasing element.

The sensing unit senses the speed of one of the vehicle wheels and converts the speed into a speed signal proportional to wheel speed, an acceleration signal proportional to wheel deceleration or acceleration, and two control signals associated with particular values of the acceleration signal. One of the two control signals, which is known as the isolating signal, starts when the increase in wheel deceleration passes through a first predetermined deceleration threshold, and ceases when wheel acceleration passes through a predetermined acceleration threshold corresponding substantially to the termination of wheel acceleration subsequent to wheel deceleration. The second control signal which is called the releasing signal, also starts when wheel deceleration passes through the first predetermined deceleration threshold, and ends when growing wheel deceleration passes through a second predetermined deceleration threshold. The actuating unit of the anti-skid device receives the two control signals produced by the sensing unit, the isolating signal going to the isolating element which, in response to and throughout the isolating signal, isolates the brake pedal from the braking system, while the releasing signal goes to the releasing element which, in response to and throughout the duration of the releasing signal, gradually reduces the pressure in the braking system to a desired value, the pressure in the isolated braking system remaining at such value until the cessation of the isolatin signal-i.e., until the brake pedal can be used operatively again and, by decelerating the wheel, produce another operating cycle.

A factor reducing the efficiency of an anti-skid device of the kind described is that both the control signals are always triggered by the same wheel deceleration value, whatever the initial speed of the vehicle may be at the time when the brakes are applied. To obviate this disadvantage, it is known for the level of the first deceleration threshold at which wheel deceleration is compared to be varied in dependence upon the value of the speed signal so that the threshold level is lower in proportion as the initial speed of the vehicle at the time of brake application is lower, with the result that the two control signals start at a lower, wheel deceleration. This modification helps to reduce the stopping distance of the vehicle as compared with the stopping distance associated with a fixed deceleration level anti-skid device, but the modified device is still not fully satisfactory in that the isolating signal cesases when wheel acceleration passes through an acceleration threshold corresponding substantially to the termination of wheel acceleration subsequent to wheel deceleration. In other words, the pressure in the braking system can be restored only at the end of the wheel acceleration period.

To obviate this inefficiency and therefore to further reduce the vehicle stopping distance, it has already been proposed that, when wheel acceleration passes through its maximum value, which corresponds to maximum of the coefficient of friction $\mu$ developed at the interface between the tyre and the road, the isolating signal should be interrupted so that pressure is restored in the braking system. This is because in order to maintain optimum efficiency, the braking system pressure must be restored when the apex of the curve $\mu = f(G)$ is reached (this curve is familiar to skilled persons and represents the coefficient of friction $\mu$ at the interface between the tire and the road in dependence upon wheel slip G).

The equilibrium equation for a braked wheel is:

$$C_a + C_i + C_f = 0$$

where $C_a$ denotes the adhesion torque, which depends upon the coefficient of friction $\mu$; $C_i$ denotes the inertia torque, which depends upon wheel acceleration, and $C_f$ denotes the braking torque.

Since upon cessation of the releasing signal the pressure in the isolated braking system remains constant, so that the braking torque $C_f$ is constant too, the equation just given is still satisfied if variations of the adhesion torque $C_a$ due to variations of the coefficient of friction $\mu$ are compensated for by equal and opposite variations of the inertia torque $C_i$ and therefore of wheel acceleration. Consequently, when wheel acceleration is maximum; so is the factor $\mu$ and corresponds in this case to optimum wheel slip.

It is therefore an object of this invention to provide an anti-skid device of the kind comprising an electronic sensing unit and an actuating unit comprising an isolating element and a releasing element with provision for interrupting the isolating signal and therefore helping to restore pressure in the braking system, when wheel acceleration subsequent to wheel deceleration has just passed its peak value. The choice of a point after the peak value for restoring the pressure does not substantially, increase the braking time and insures that the most advantageous condition is reached.

The preferred embodiment of the invention will now be described by way of example with reference to the accompanying drawings, in which.

Figure 1:
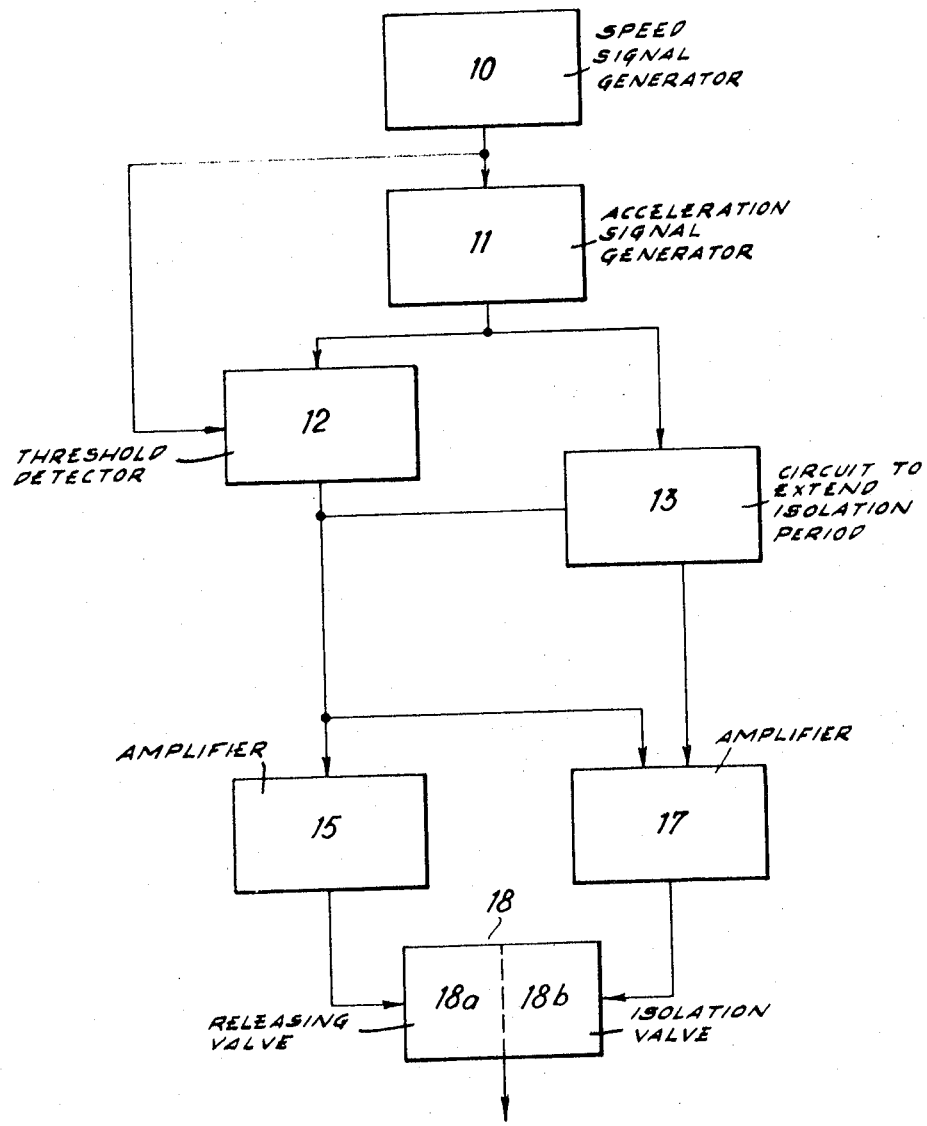
FIG. 1 is a block diagram of an anti-skid device according to the invention.

Referring now to FIG. 1, there can be seen an embodiment of an anti-skid device for one wheel, the device comprising a sensing unit and an actuating unit, the sensing unit comprising a speed signal generator 10, a (positive or negative), acceleration signal generator 11, a threshold detector 12 responsive to two values of the deceleration portion $-\gamma$ of the accleration signal, the arrangement 13 according to the invention which responds to the last one of the threshold values and to a value just beyond the peak value of the positive portion $+\gamma$ of the acceleration signal, a releasing control signal amplifier 15 and an isolating control signal amplifier 17, while the actuating unit 18 comprises a releasing electro-valve 18a and an isolating electrovalve 18b whose output acts on the braking system.

The speed signal generator 10 senses wheel speed and converts it into an electrical signal whose level depends upon wheel speed. Generator 10 can take the form either of a tachometer dynamo providing a signal voltage proportional to wheel speed or of a variable reluctance alternating current type generator providing a signal having a frequency varying directly as the wheel speed and which is converted in a frequency-voltage converter into a signal proportional to wheel speed The (positive or negative) acceleration signal generator 11 receives the speed signal and differentiates it so as to provide a signal voltage proportional to wheel deceleration or acceleration. Generator 11 comprises, e.g., a RC circuit driving an operational amplifier.

The threshold detector 12 receives the acceleration signal but responds only to the deceleration portion $-\gamma$ thereof. This detector provides a control signal when the deceleration portion $-\gamma$ exceeds a level corresponding to a predetermined wheel deceleration threshold which is in practice, for instance, somewhere between 10 and 80m/sec/sec. Detector 12 can be embodied by a Schmitt trigger, using an operational amplifier, which is switched from its first stable state to its second stable state when the deceleration portion $-\gamma$ reaches a predetermined level and which is again switched into its first stable state when the deceleration portion $-\gamma$ has returned substantially to its predetermined level. The Schmitt trigger provides a control signal during the time that it remains in its second stable state.

The arrangement 13, which will now be described in detail, provides a control signal from the moment when the threshold detector 12 issues a signal, to the moment when the acceleration has just passed the peak value of its positive portion $+\gamma$ The control signal provided by detector 12 is amplified in amplifier 15, which can be a conventonal d.c. amplifier and the amplified control signal is applied to the releasing electro-valve 18a of the actuating unit to operate such valve.

The control signal provided by detector 12, the control signal provided by the arrangement 13 is fed to amplifier 17, which can also be a conventional d.c. amplifier, and the resulting amplfied control signal is applied to operate the isolating electro-valve 18b of the actuating unit 18.

Figure 2:
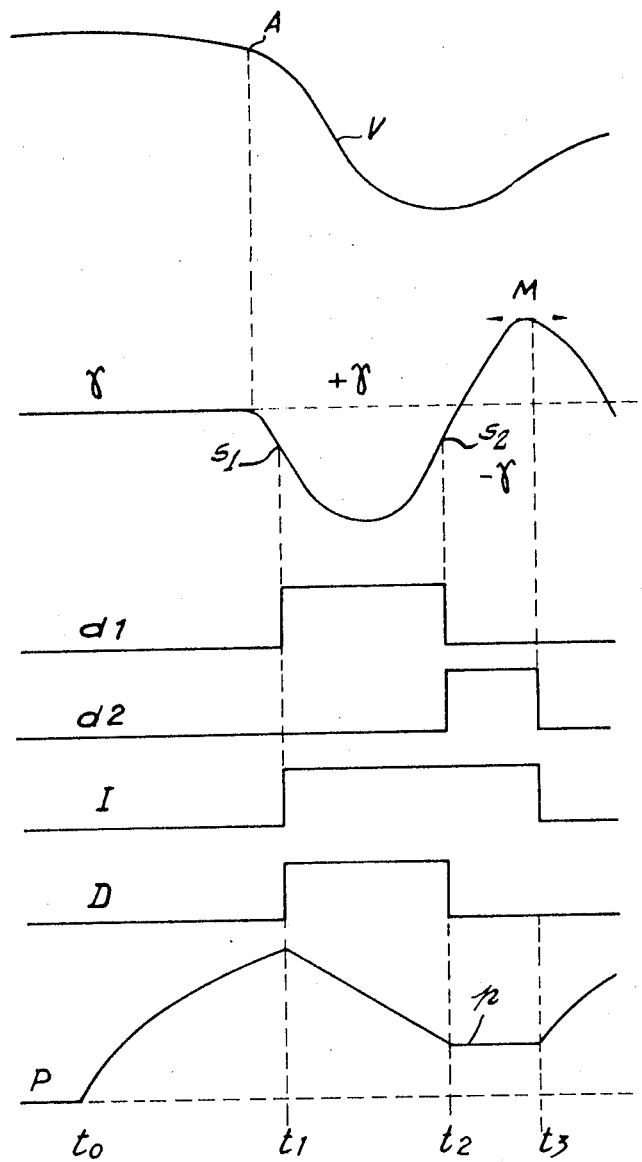
FIG. 2 shows the operating curves of the anti-skid device referred to in FIG. 1.

Reference will now be made to FIG. 2 to explain the operation of the embodiment just described. Curve V represents the speed signal provided by generator 10 and corresponds to the linear speed of the wheel. Curve $\gamma$ represents the acceleration signal provided by generator 11 and corresponds to the linear deceleration $-\gamma$ and then to the linear acceleration $+\gamma$ of the wheel. Curve $d_1$ represents the control signalprovdied by threshold detector 12. Cruve $d_2$ represents the control signal provided by the arrangement. Curve I represents the resulting amplified control signal which is used to operate the isolating electro-valve 18b and which is provided by amplfifier 15, and curve P represents the pressure acting in the braking system.

The pressure (curve P) acting in the braking system is applied at a time $t_o$. Shortly afterwards, at a point A on curve V, wheel speed starts to decrease. Because of the presence of the anti-skid device, if the pressure produced by the driver in the braking system is excessive, as soon as wheel deceleration reaches a predetermined threshold at a time $t_1$, the $-\gamma$ portion of the acceleration signal reaches the triggering level of the threshold detector 12 (at a point $S_1$ on curve $\gamma$), so that detector 12 is triggered and immediatedly produces a control signal (curve $d_1$) which by means of amplifier 17 initiates the operating of the isolating electro-valve 18b (curve I) of the actuating unit 18 so as to isolate the braking system from the brake pedal and which simultaneously by means of amplifier 15 initiates the operating of the releasing electro-valve 18a (curve D) so as to gradually reduce the pressure in the braking system. After wheel deceleration has reached a peak value, wheel speed decreases more slowly and wheel deceleration decreases and passes through a second predetermined threshold substantially equal to the first threshold,while the $-\gamma$ portion of the acceleration signal drops to the value at which it interrupts the threshold detector 12 (at a point $S_2$ on curve $\gamma$), so that the production of the control signal (curve $d_1$) ceases a time $t_2$, the operation of the releasing electro-valve 18a (curve D) is interrupted, and there remains in the braking system a small pressure p which stays constant for as long as the braking system stays isolated. Cessation of the control signal (curve $d_1$) would also interrupt operation of the isolating electro-valve 18b were it not for the fact that at the time $t_2$ the trailing edge of such control signal (curve $d_1$) triggers the arrangement 13, which responds by providing a control signal (curve $d_2$) which acts via amplifier 17 to keep the isolating electro-valve 18b (curve I) in operation.

When wheel acceleration passes its peak value, the control signal (curve $d_2$) provided by the arrangement 13 ceases, the cessation occuring at a time $t_3$. The resulting signal for controlling the isolating electro-valve 18b curve I and the operation thereof also cease. The brake pedal can therefore operate the braking system again when the coefficient of friction $\mu$ is substantially maximum, and if the vehicle driver continues to apply a high pressure in the braking system (as is usually the case), then immediately wheel deceleration passes through the predetermined threshold again (corresponding to the point $S_1$ on curve $\gamma$), the cycle repeats. However, the speed loop is of smaller amplitude and shorter period than in the previous case, and similar considerations apply to the further cycles which ensue until the vehicle stops normally.

Figure 3:
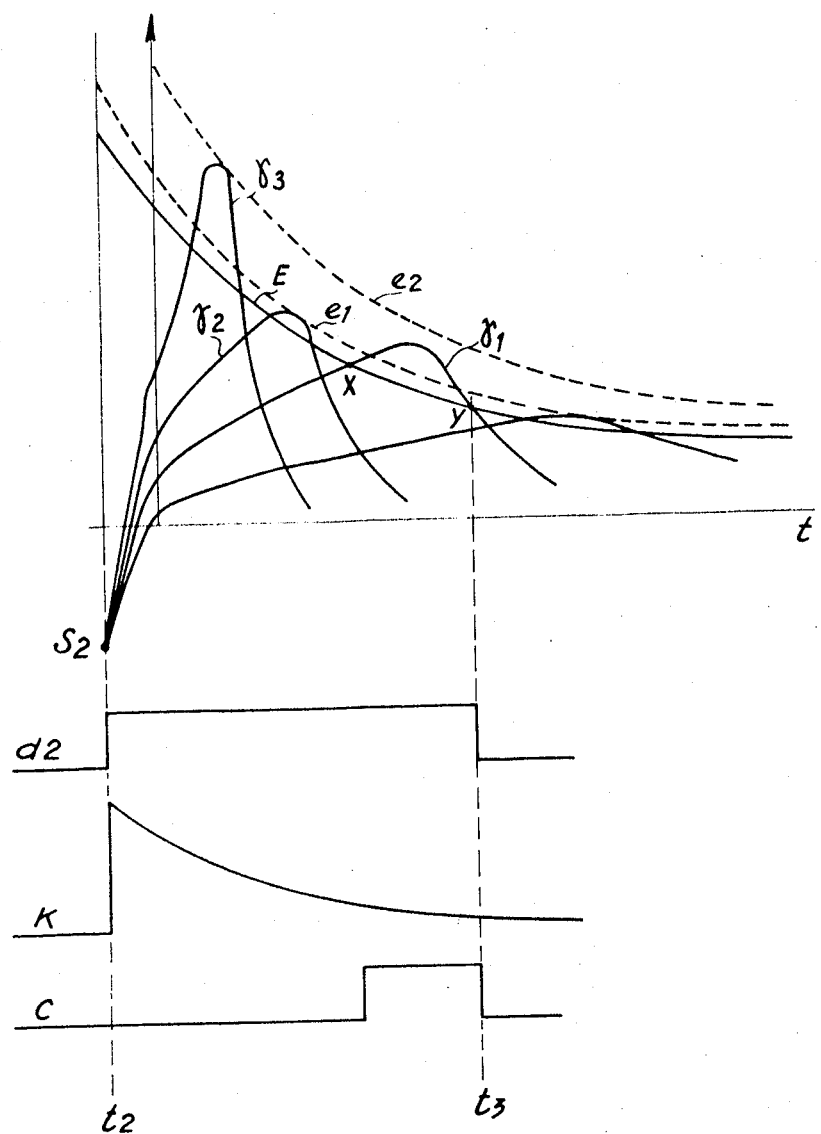
FIG. 3 shows another set of operating curves.

The triggering level of the threshold detector 12 can be adjusted manually and, as previously mentionned, can also be adjusted in dependence upon the speed signalwhich is applied to the threshold detector 12 via line 12'. Also, the anti-skid device can be brought into operation by use of the brake pedal similary to the case, for instance, of energizing a stop light. FIG. 3 is a large scale partial representation of FIG. 2 which will be used for showing how the arrangement 13 detects a point just after the maximum acceleration.

In FIG. 3, there has been traced a family of acceleration curves $\gamma 1, \gamma 2 \ldots$ similar to the curve $\gamma$ in FIG. 2. These curves have been obtained by varying different parameters such as the road condition, the isolation pressure, the load and the speed of the vehicle. However, the curves have only been traced from time $t_2$, hence from the end of the pressure release defined by point $S_2$ on FIG. 2.

It will be remarked that the apices of curves $\gamma 1, \gamma 2$, .., that is the maximum accelerations, are contained within a narrow band whose boundaries are two exponentially-shaped curves $c_1$ and $c_2$ shown in dotted lines.

It is possible to trace a curve E below the lower curve $e_1$. The curve E can be defined by the function:

$$y = Ke^{-t/t_1} + y_o$$

in which:
y is the acceleration at time t,
$y_o$ is the residual acceleration,
K is a constant connected with the acceleration level,
$t_1$ is a constant connected with the vehicle inertia.

Curve E intersects every acceleration curve in two points such as X and Y on curve $\gamma1$.

As will be seen later, the arrangement 13 comprises a timing circuit producing, simultaneously with the control signal $d_2$ a signal K (represented as curve K) which can be assimilated to the curve E. Consequently, the signal K and the acceleration signal $\gamma$ will have equal levels on two points X, Y of the curves Curve C represents a square signal which is produced during the interval of time between points X and Y. The derivative of the trailing edge will be used for interrupting the control signal $d_2$, hence the signal isolating the braking system. It can be seen that the isolation signal will cease shortly after the maximum acceleration.

Figure 4:
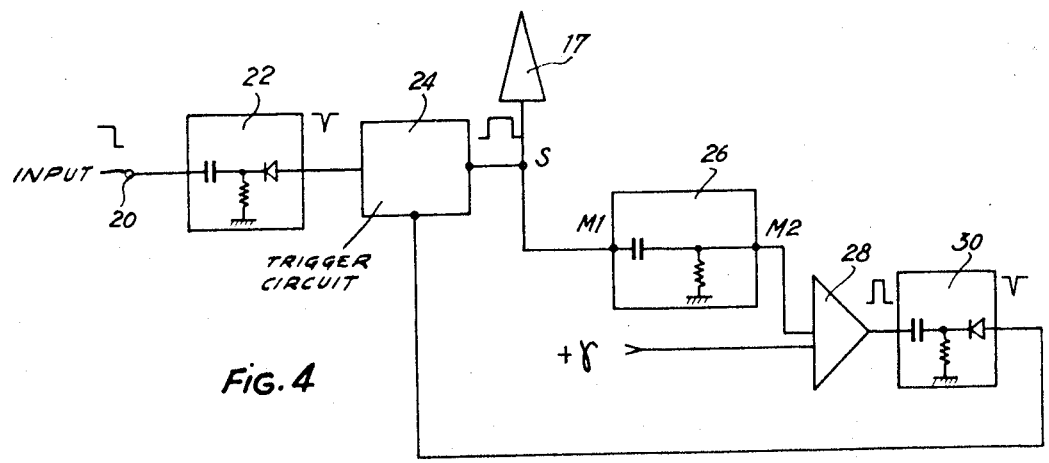
FIG. 4 is a diagram of the arrangement utilized in the invention.

Referring now to FIG. 4 which represents the diagram of the arrangement 13, the control signal of the threshold detector 12 (curve $d_1$ in FIG. 2) is applied through an input terminal 20 to a first differentiating circuit 22 comprising a diode which conducts only the trailing edge of the signal. The differentiating circuit 22 is followed by a resettable trigger circuit 24, by a RC circuit 26 feeding the first input of a differential amplifier 28, and by a second differentiating circuit 30 comprising a diode blocking one direction of the signals. The second input of the differential amplifier 28 receives the positive portion $+\gamma$ of the acceleration signal. The output of the second differentiating circuit 30 is connected to the second input of the resettable trigger circuit 24. The output of the trigger circuit already connected to the RC circuit 26, is also connected to the amplifier 17 (see FIG. 1) controlling the solenoid 18b which isolates the braking system.

The trigger circuit 24 is preferably a monostable circuit having an initial (0) state producing no output signal and shifting in response to a trigger signal applied on its first input to a (1) state producing a constant level output signal, returning then to its initial state either in response to a signal applied on its second input, or at the expiration of its proper relaxation time.

Differential amplifier 28 is a high gain amplifier having one of its input terminal biased. This amplifier has no neutral position. It delivers a constant level signal when the signal applied to its first input has a higher level than the signal applied to its second input.

In the operation of arrangement 13, the trailing edge of the control signal from the threshold detector 12 (curve $d_1$ on FIG. 2) produces at the outupt of the first differentiating circuit 22 a pulse which is applied to the first input of the trigger circuit 24 to switch the this circuit to the (1) state in which it produces a constant level output signal S. This signal (curve $d_2$ in FIGS. 2 and 3) is applied on the one hand to the amplifier 17 and to the other hand to the input M1 of the RC circuit 26. Through amplifier 17, the signal maintains the isolation of the braking system which would otherwise have been interrupted at the end of the signal from threshold detector 12. The signal S also charges the condenser in the RC circuit 26 and the output of the RC circuit is a signal K (curve K in FIG. 3) which is applied to the first input of the differential amplifier 28. The condenser and the resistor in the RC circuit 26 are so selected that the discharge curve is matched with the curve E (FIG. 3)

The signal K applied to the first input of the amplifier 28 decreases exponentially while the signal $+\gamma$ applied to the second input has a peak value, and the levels of these signals are equal on two occasions, corresponding to points X and Y in FIG 3. The differential amplifier 28 will deliver an output signal of constant level beginning with the first signal equalization and ending with the second signal equalization. Due to the blocking effect of the diode in the second differentiating circuit 30, this circuit will be responsive only to the trailing edge of the output signal of amplifier 28, delivering than a release pulse to the trigger circuit 24. When the trigger circuit will be back in its initial (0) state, the electro-valve 18b will be open and the fluid pressure will be restored in the braking system to begin a new cycle comprising a period of braking and a period of isolation, and this process will be repeated as long as the pedal is depressed or until the vehicle speed is substantially reduced.

If by accident, the trigger circuit 24 does not respond to the release pulse and if this trigger circuit is, as recommended, of the monostable type, the braking cycle will be resumed at the end of the relaxation time of the trigger circuit.

From the foregoing, it can be seen that a point just after the maximum acceleration can be detected with the arrangement of FIG. 4 by comparing the acceleration signal with a signal representative of the exponential curve E (FIG.3). This arrangement gives satisfactory results, although the maximum accelerations lie in the band comprised between the curves $e1$, $e2$, the uncertainty of their location being due to the dispersion of the various parameter However, the results can be improved by providing the arrangement 13 with a means for adapting the comparison curve to the various acceleration curves which result from the parameter dispersion.

It has been remarked that one of the major causes of dispersion lies in the wheel speed affecting both the level and the time of the maximum acceleration.

Figure 5:
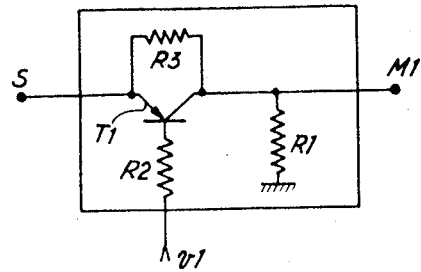
FIGS. 5 and 6 are diagrams partially illustrating modified forms of the arrangement of FIG. 4.

It is to be noted that the shape of the exponential curve $y = K e^{-t/t_1} + y_o$ is determined by the values of the factor $K$ and $t_1$, and it will be seen that either or both of these values can be controlled by the speed of the wheel. FIG. 5 illustrates a circuit in which the speed of the wheel controls the level of the signal K representative of the exponential function. The circuit of FIG. 5 is adapted to be inserted between the output S of the trigger circuit 24 and the input M1 of the RC circuit 26. In this circuit, a transistor T1 and a series resistor R1 are inserted between point S and ground. The common point of transistor T1 and resistor R1 is connected to the point M1. A signal v1, function of the wheel speed, is applied to the base electrode of transistor T1 through a resistor R2.

Figure 6:
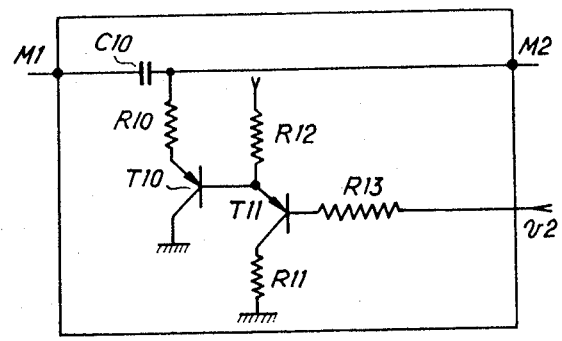

In the operation of the circuit illustrated in FIG. 5, the transistor T1 and the resistor R1 constitute a voltage divider delivering to the RC circuit 26 a portion of the output voltage of the trigger circuit 24, this portionn being variable as a function of the collector-emitter resistance of the transistor T1, hence as a function of the wheel speed. It is recommended to connect a resistor R3 across the transistor T1 to facilitate tuning of the circuit FIG. 6 illustrates a circuit in which the speed of the wheel controls the factor $t1$ of the exponential curve. This circuit will replace the RC circuit 26 in FIG. 4. It comprises a condenser C 10 inserted between the points M1 and M2 (see FIG. 4), a first transistor T10 inserted between point M2 and ground through a resistor R10, and a second transistor T11 inserted between the base electrode of transistor T10 and ground. The common point of the base electrode in transistor T10 and the emitter in transistor T11 is connected to a source of voltage through a resistor R12. The base electrode of transistor T11 receives through a resistance R13 a signal $v2$ varying as a function of the wheel speed.

In the operation of the circuit illustrated in FIG. 6 the charge of the condenser C10 takes place when the trigger circuit 24 is triggered to produce an output signal, and the discharge of the condenser takes place through the path comprising the resistor R10. and the collector-emitter resistance of transistor T10. The total resistance of this path, hence the time constant T1 of the circuit, varies as a function of the wheel speed. In fact, due to the fact that the signal $v2$ varies with the wheel speed, the transistor T11 is poorly conducting at low speeds, while the transistor T10, biased by the resistance R12, is highly conducting. Hence the discharge path of condenser C10 is practically reduce to resistor R10 allowing a quick discharge. Conversely, at high speeds, the transistor T11 becomes highly conducting while the transistor T10 tends to blocking. The discharge of the condenser C10 becomes slower as the resistance of the discharge path increases.

The modifications illustrated in FIGS. 5 and 6 are not costly and allow the braking action to be restored as soon as possible after the maximum acceleration, at a moment when the road-tire adhesion is also at a maximum.

We claim:

1. In a vehicle having a wheel and a fluid pressure actuated brake operated by a brake pedal for controlling said wheel, an anti-skid device comprising:
    sensing means for generating a first signal proportional to the rotational speed of said wheel;
    means for differentiating said first signal to generate a second signal proportional to acceleration and deceleration of said vehicle wheel, said second signal having a negative portion going through a minimum value and a positive portion going through a maximum value;
    means for generating a pressure modulation signal when the value of said second signal drops below a first predetermined reference level and terminating said pressure modulation signal when the value of said second rises arises above a second predetermined reference level;
    a control circuit including resettable means for generating a control signal upon termination of said pressure modulation signal when the value of said second signal rises above said second reference level, circuit means responsive to generation of said control signal for generating an exponentially decaying signal, a curve representing the value of the latter signal intersecting a curve representing the value of said second signal at a point below the maximum value of the positive portion of the curve representing said second signal, comparing means for comparing the value of said exponentiating decaying signal with the positive portion of said second signal and generating an output signal when the value of the latter drops below the value of said second signal as the value of said second signal rises toward said maximum value and terminating said output signal when the value of the acceleration signal drops below the value of said exponentially decaying signal as the value of said second signal declines after said maximum value is attained, and means responsive to termination of said output signal for generating a resetting signal, said resettable means being responsive to said resetting signal to terminate said control signal; and
    means responsive to said pressure modulation signal and to said control signal to isolate said brake from said brake pedal while the pressure modulation signal and the control signal are produced.

2. The invention of claim 1; and
    means responsive to said pressure modulation signal for progressively reducing the fluid pressure in the isolated brake while said pressure modulation signal is generated.

* * * * *